July 29, 1952  A. RONNING  2,605,114

STEERABLE TRAILER SUPPORT

Filed April 5, 1948  6 Sheets-Sheet 1

Inventor
ADOLPH RONNING
By Carlsen & Hagler
Attorneys

Inventor
ADOLPH RONNING

By Carlsen & Hagle
Attorneys

Patented July 29, 1952

2,605,114

UNITED STATES PATENT OFFICE 2,605,114

STEERABLE TRAILER SUPPORT

Adolph Ronning, Minneapolis, Minn.

Application April 5, 1948, Serial No. 18,970

15 Claims. (Cl. 280—33.5)

My invention relates to improvements in steerable rolling supports for trailer-type vehicles.

The primary object of my invention is to improve the front end, wheeled supports for trailers of various kinds and to provide a support in which the wheels are steerable or dirigible about an upright axis and with a draft connection for the towing vehicle or tractor, and with means for selectively locking the support and draft connection element to the trailer against such steering movements with the draft connection element positioned for straightaway travel. As is well known to all who have operated tractor-trailer vehicles the backing of the combination is frequently very difficult to control due to a jackknifing tendency of the draft connection. Considering, as an example, a tractor-trailer set up in which the front wheels of the trailer are steered by a draft tongue which is pivotally attached at its forward end to the tractor, it will be readily appreciated that in backing up the tongue will often be turned to steer the trailer wheels setting up a very aggravated and aggravating, jackknifing action so that the steering of the trailer in its rearward path is difficult, if not well nigh impossible. In accordance with my invention, however, the steerable connection of the trailer is locked as a preliminary to backing up, with the draft tongue positioned for straightaway travel. Then as the tractor is reversed, a much more direct control is had over the trailer and jackknifing is prevented as will be readily appreciated.

Another object is to provide an improved front end support for trailer vehicles having means for locking the support against steering movements, responsive to so-called "surge" forces, and again with the parts in position for straightaway travel. As a safety feature this is of great importance. For example, when the trailer is heavy, or is heavily loaded, and the equipment is being operated at high speed, the application of the brakes on the tractor vehicles has a tendency to initiate the same jackknifing action previously described, often with disastrous consequences. In accordance with my invention, the forward surge of the trailer as the tractor is braked will automatically lock the trailer support so that it will not steer off to either side but will keep the trailer in line behind the tractor.

The subject matter of this application is similar to that disclosed in my application Serial No. 26,203 for Steerable Trailer Front Wheel Mechanism, filed May 10, 1948.

Further objects of my invention reside in the provision of several advantageous structures and arrangements for carrying out the foregoing objects, all as will appear hereinafter in the course of the following detailed specification, wherein reference is had to the accompanying drawings, in which:

Figure 1:
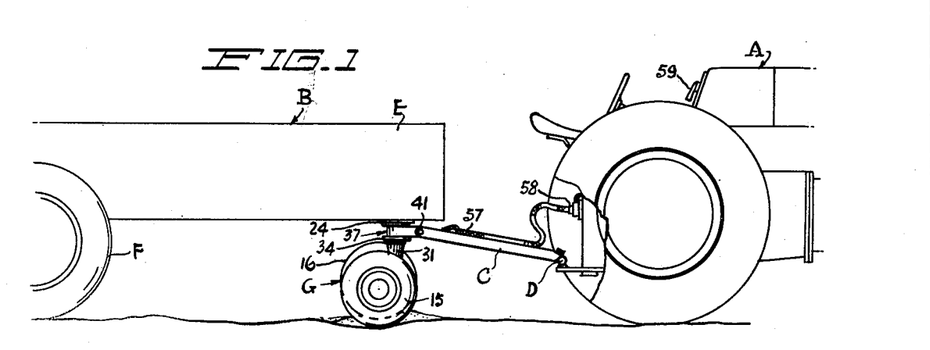
Fig. 1 is a side elevation of a tractor-trailer vehicular combination embodying my invention.
Figure 2:
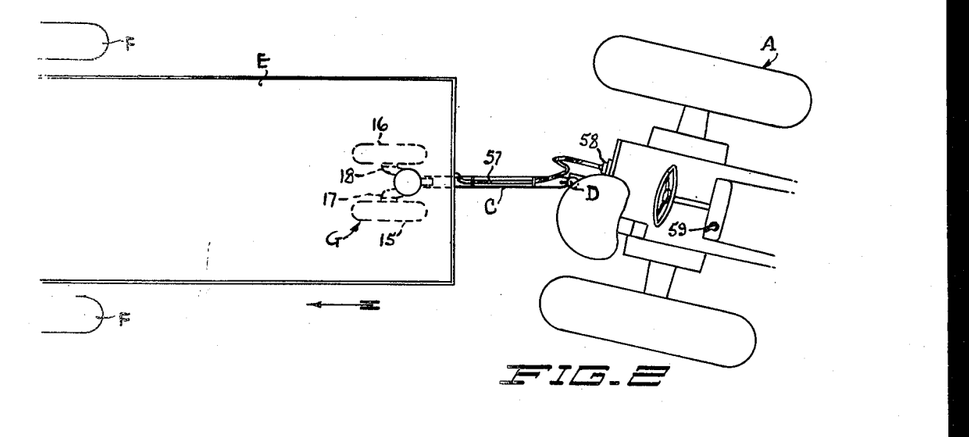
Fig. 2 is a plan view, showing the trailer draft tongue locked for straightaway travel, as the tractor is backed.

Referring now more particularly and by reference characters to the drawing, I have shown there in Figs. 1 and 2 a vehicular combination of a tractor A, and a trailer B adapted to be pulled by the tractor through a draft tongue C having a conventional releasable hitch connection D at its forward end to the tractor draw bar. The trailer B includes a frame or body E supported at the rear by the usual ground wheels F and at the forward end by a steerable rolling support G which will be described in detail herein. While I have here shown a wagon-like trailer and farm tractor combination to illustrate my invention, it is to be understood that it will have many other applications, within the scope of my invention, at least one of which will be discussed hereinafter.

The support G, as shown in Figs. 1–4, comprises a closely spaced pair of differentially mounted wheels 15 and 16 which are journaled at the rear ends of crank arms or crank axles 17 and 18, the forward journal ends 19 and 20 of which are journaled in vertically spaced relation transversely in and through a gear housing or case 21. Within said housing the crank ends 19 and 20 have secured thereon meshing gears 22 and 23, and the arrangement is thus such that an upward swinging movement of either wheel upon its axle will be accompanied by an equal downward movement of the other. Thus the wheels accommodate themselves to the irregularities in the road surface over which they travel (see Figs. 1 and 4) with a minimum vertical displacement of the vehicle they support. The differential mounting here disclosed being similar to that shown and claimed in my United States Patent No. 2,244,853, issued June 10, 1941, no further description should be necessary herein.

For supportably connecting the wheels to the trailer frame or body E I provide two main elements or parts, respectively, non-rotatable and rotatable about an upright axis, and designated generally at 24 and 25. As here shown the element 24 is secured to the trailer while the element 25 is secured to the wheeled support to move therewith. The element 24 comprises a bearing sleeve 26 depending from a cap 27 which is secured, as by welds 28, in an opening 29 on the bottom of the trailer frame or body, or is otherwise anchored to the underside of the trailer. Also forming part of this element is an elongated king pin or post 30 which depends through the sleeve 26 for some distance therebelow and which is a press fit or other non-rotatable fit in and through the sleeve.

The depending end of the pin 30 forms an upright bearing for a tubular knuckle or knuckle sleeve 31 extending upwardly from the gear case 21 and to hold the parts from downward disassembly a lock pin 32 on the sleeve 31 passes tangentially through a circumferential groove 33 in the lower end of pin 30. The upper end of the tubular spindle or sleeve 31 is flared outwardly, or diametrically enlarged, forming a support table or flange 34 and in this end there is placed an anti-friction thrust bearing 35 whereon rests the lower end of the sleeve 26 to transmit the weight of the forward part of the trailer down to the wheels 15 and 16. Stiffening webs 36 are provided for the usual purpose vertically along the knuckle sleeve 31.

The lower surface of the cap 27 and flange 34 of the respective non-rotatable and rotatable elements 24 and 25 are spaced apart some distance vertically and mounted between them, coaxially with the vertical axis of the assembly, is a draft transmitting member designated generally at 37 having a collar 38 journaled about the bearing sleeve 26, upon an intervening bushing 39. Forwardly extending from opposite sides of the collar 38 (see Fig. 3 particularly) are two arms or ears 40 which are apertured at forward ends to accommodate pivot bolts 41. The tongue C aforesaid is of tubular material and has rearwardly extending ears 42 overlapping the arms 40 and also apertured to pass the bolts 41. The tongue is thus connected to the support G with limited freedom for vertical swinging movements about the axes of the bolts 41. This is, of course, to allow play as the tractor and trailer travel over uneven surfaces and also to accommodate the tongue to different hitch heights on the tractor.

Figure 4:
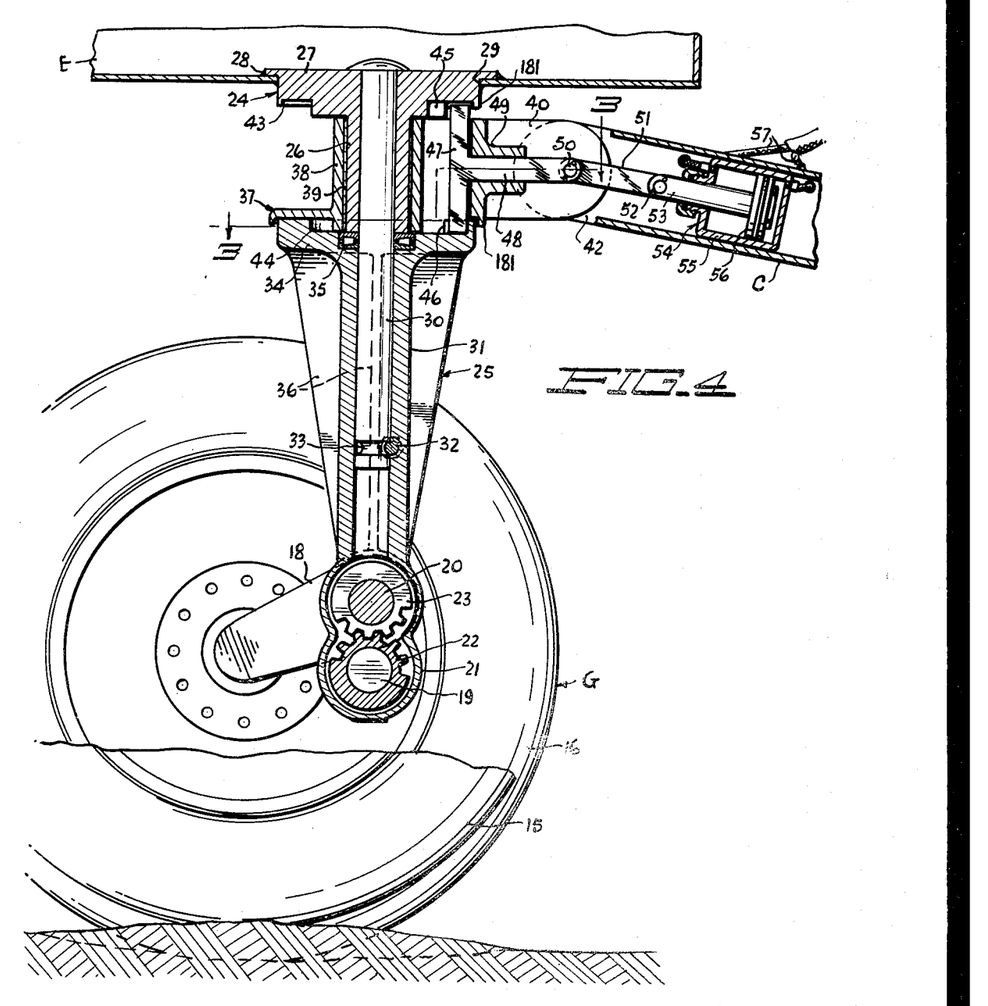
Fig. 4 is an enlarged fragmentary vertical and longitudinal section, partially in elevation, of a trailer front end support according to my invention.

The lower surface of the cap 27 and upper surface of the flange 34 have annular grooves 43 and 44, respectively, centered about the axis of the pin 30 and these grooves are of different diameters as seen in Fig. 4, the upper groove 43 having an inside diameter slightly larger than the outside diameter of the lower groove 44. An outwardly radially flaring notch 45 is formed in the inside edge of the upper groove 43 in a position centered on the longitudinal axes of the trailer, and an inwardly radially flaring notch 46 is formed in the outside edge of the lower groove 44, the latter notch being so located as to lie in the same vertical, longitudinal plan as the notch 45 when the wheels 15 and 16 are positioned for straightaway travel of the trailer. Cooperating with these notches is a vertical locking bar or keeper 47 the length of which is such that it may fit loosely between the grooves 43 and 44. This locking bar 47 is supported and actuated by a center, forwardly extending shank 48 slidably but non-rotatably extending through a bearing or support 49 joining the ears 40. Adjacent the transverse axis of the pivot bolts 41 the shank 48 is pivoted at 50 to a link 51 which extends forwardly into the tongue C and which is in turn pivoted at 52 to the plunger 53 of a fluid motor 54. Said motor has a cylinder 55 secured on the tongue C and into either end of the cylinder, upon opposite sides of a piston 56 on the plunger 53, fluid may be led through conduits 57. These conduits lead forwardly along the tongue C to any suitable and well known form of connection 58 (Figs. 1 and 2) on the tractor A, so that fluid under pressure from a source (not shown) on the tractor may be transmitted to the motor 54 to actuate the plunger 53 in opposite directions under control of a valve 59, convenient to the tractor operator's hand. The opposite movements of the plunger 53 will, of course, be transmitted to the shank 48 through the link 51 to move the locking bar 47 in a radial direction with respect to the axis of the steerable support assembly and it will be noted that, since the pivot 58 is very close to the pivot axis for the tongue C, the up and down movements of the forward end of the tongue will have a minimum of effect upon the shank 48 and locking bar.

Figure 3:
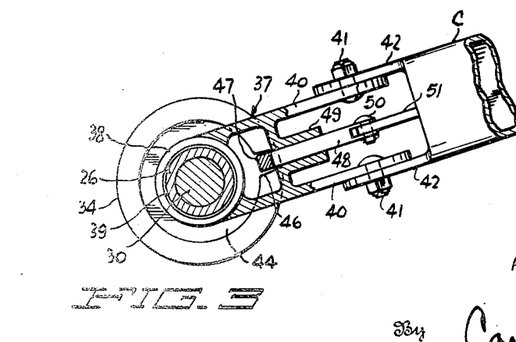
Fig. 3 is a fragmentary horizontal sectional view along the line 3—3 in Fig. 4.

In normal operation, with the vehicles traveling forwardly, the locking bar 47 stands in the positions of Figs. 3 and 4, or engaged at its lower end with the lower notch 46. The draft connecting element 37 will then transmit the pull from the tractor to the support and the trailer and will be also connected through the locking bar to the rotatable element 25 of the assembly. Thus, as the tractor is steered, the angular steering movements of the tongue C will be transmitted to this element 25 causing the wheels 15 and 16 to be steered as necessary for proper trailing, as will be readily understood.

Now when it is desired to back the trailer, fluid is admitted to the forward end of the motor cylinder 55 to urge the piston 56 and plunger 53 rearwardly and this motion, transmitted through the link 51, will urge the shank 48 and locking bar 47 rearwardly, or radially inward toward the steering axis. Assuming the tongue C at this time to be straightened out so that the wheels 15 and 16 are positioned for straightaway travel of the trailer (Fig. 2) the locking bar 47 will now enter at its upper end into the upper notch 45 locking the member 37 to the non-rotatable element 24 so that the tongue cannot swing. Thus, the rearward motion will be imparted to the trailer without any tendency to swing its forward wheels and cause it to jackknife as will be readily understood.

It will be noted that, as the locking bar 47 starts to enter the upper notch 45 to lock, its lower end is moving out of the lower notch 46 so that during the transition period the rotatable and non-rotatable elements 24 and 25 are locked together. As the locking bar then comes to rest fully in the notch 45 it completely clears the lower notch 46 and the lower or rotatable element 25 is then freed so that the wheels may caster about, being offset by the cranks 17—18 from the steering axis, and accommodate themselves without any steering affect to the rearward travel of the trailer. The wheels are shown in Fig. 2 prior to their castering about from their normal positions.

The purpose of oppositely flaring the notches 45 and 46 is, of course, to aid in guiding the locking bar 47 into proper engagement, it being understood that the bar may be urged toward either notch before it is properly aligned therewith in certain positions of the tongue C and under certain conditions of operation.

Figure 5:
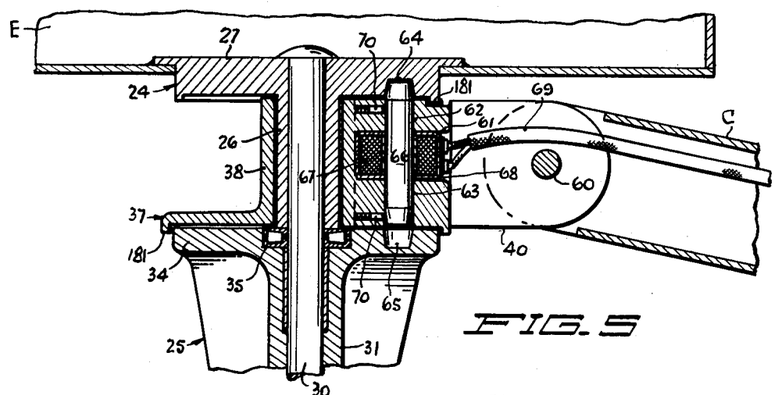
Figs. 5 and 6 are, respectively, fragmentary sectional views like the upper part of Fig. 4, showing electrical and fluid operated means for locking the support.

Referring now to Fig. 5 of the drawing I show therein a construction which differs in that a shuttle-like lock is used instead of the radial-type locking bar 47. Also an electrical control for the lock is here shown. Here the non-rotatable and rotatable members are again designated at 24 and 25, respectively, and since in many respects they are identical with the parts previously described, they are designated by like reference characters. Thus, the element 24 has a cap 27 welded to the trailer frame or body E, and a depending bearing sleeve 26 through which depends the pin 30 upon which rotates the knuckle 31 of the element 25. Said knuckle has a flanged upper end 34 in which is a load transmitting bearing 35 and between the cap 27 and flange 34 there is positioned a draft and steering member 37 having a collar 38 and forwardly extending ears 40 to which the tongue C is pivoted, in this case by a single cross pin or bolt 60.

On the forward side of the member 37 forward of the collar 38 there is a recess 61 having upper and lower openings 62 and 63 adapted to communicate with, and register with, upper and lower locking recesses or notches 64 and 65 formed in the respective lower and upper faces of the cap 27 and flange 34. Slidably mounted in the openings 62 and 63 is a shuttle-like locking pin or bar 66 which is of such length that it may enter either of the recesses 64 or 65, while clearing the other. As clearly shown, the ends of the pin 66 are tapered to correspond to a similar shape of the recesses 64—65, again to aid in guiding the pin home.

For actuating the locking pin endwise, upwardly and downwardly, I have shown a solenoid coil 67 in a case 68 fitted in the recess 61 and having a center opening slidably passing the pin. Leads or conductors 69 lead off from the coil 67 and may be connected to a battery (not shown) on the tractor for energizing the coil. By use of a polarity reversing switch (also not shown) the pin 66 (being, of course, made of ferrous material) may be moved by magnetic forces in the desired directions as will be clearly evident.

The locking pin 66 is snapped or cammed home in either recess 64 or 65 by the action of spring pressed plungers 70 on its tapered ends, the plungers being mounted as clearly shown to bear inward radially on the pin and exert an endwise camming action on the ends thereof.

In operation, the locking pin 66 will obviously lock the member 37, and the tongue C, to the rotatable element 25 when the pin is moved downwardly, to steer the front wheels of the trailer by the tongue. When moved upwardly, as it is shown in Fig. 5, the pin will then lock the member 37 and the tongue to the non-rotatable element 24, with the tongue extending straight forwardly as previously described.

Figure 6:
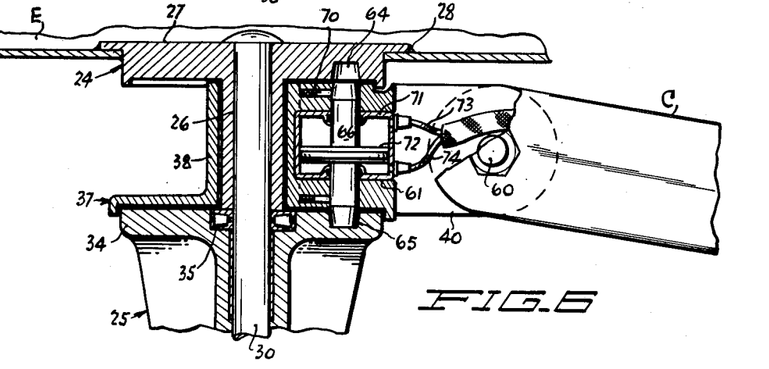

Referring now to Fig. 6 I show a construction therein which is essentially identical to that in Fig. 5 and like parts are designated throughout by the same reference characters. In this case, however, the locking pin 66 is slidably mounted through a cylinder 71 mounted in the recess 61 and within the cylinder the pin carries a piston indicated at 72. Fluid under pressure may be brought into either end of the cylinder selectively through conduits 73 and 74 to thus obviously actuate the pin in either direction. No source of such fluid is disclosed since it may be oil taken from the supply upon the tractor previously referred to, or may be air taken from the brake actuating supply where air brakes are used.

Figure 7:
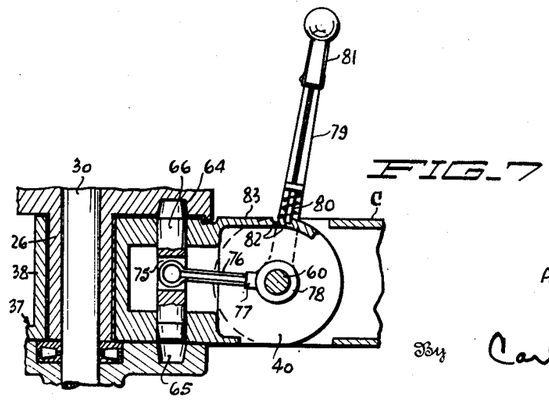
Fig. 7 is a similar view showing a hand actuated lever locked support.

In Fig. 7 I also show a substantially identical construction but in this case, the locking pin 66 has a center transverse slot 75 in which plays the looped or folded end of a leaf spring 76. The said spring is anchored at 77 to the collar end 78 of a hand lever 79 which is oscillatably mounted upon the pin or bolt 60 connecting the tongue C to the member 37. Thus it will be seen that the locking pin will be moved upwardly or downwardly by swinging the upper end of the lever 79 in forward and rearward directions and for locking the pin in either of such positions, I provide a conventional latch pawl 80 which is actuatable by a latch handle 81 on the lever and may engage either of two notches 82 formed in an upper extension 83 of the member 37. It will be evident that remote control linkage (not here shown) may be extended forwardly from the lever 79 so that it may be operated from the tractor.

The spring 76 provides flexibility such that the lever 79 may be adjusted to either position, for urging the locking pin 66 either upwardly or downwardly, while out of registry with the recesses 64 and 65 and then when the parts move around and register the pin with the proper recess the pin will snap into place by the action of the spring. This makes it possible for the operator to adjust the lever 79 to the desired position, and then return to the tractor and upon proper maneuvering thereof the pin will lock or unlock the tongue as may be desired. The arrangement as here shown is thus particularly suitable for house trailers and the like.

Figures 8, 9:
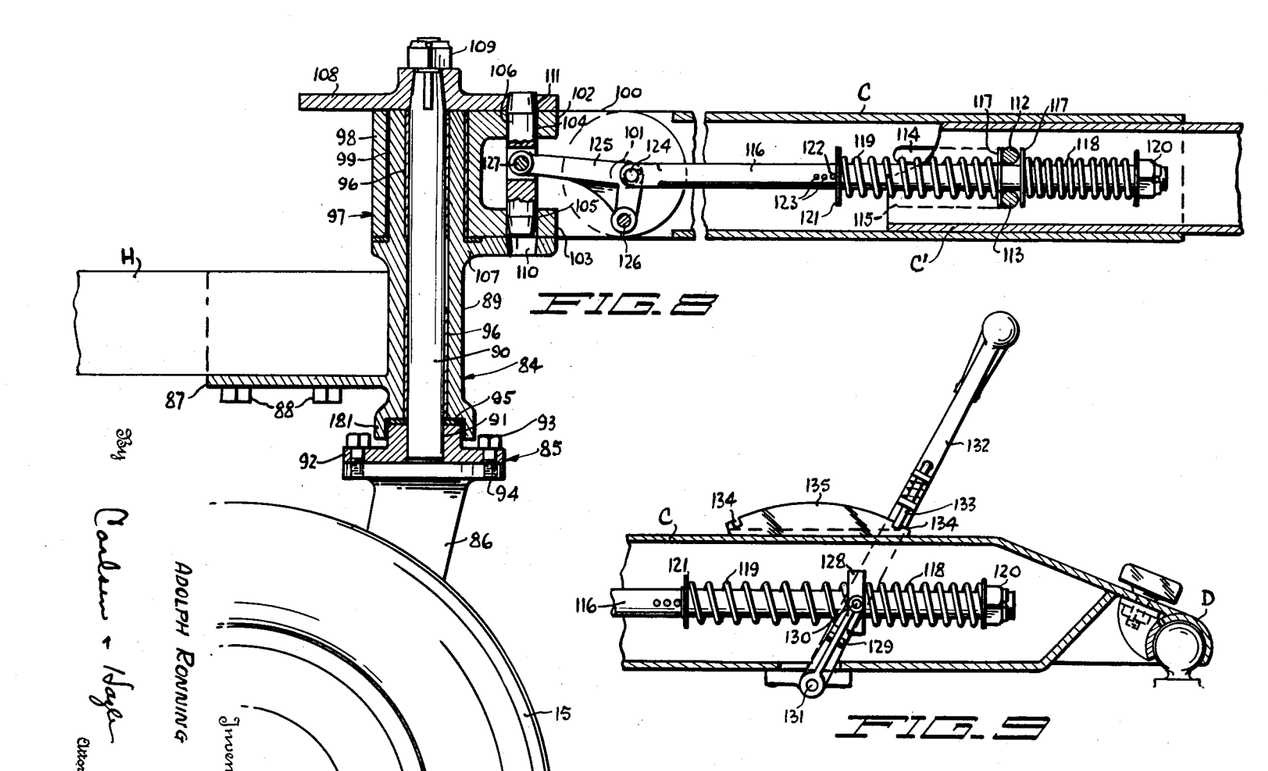
Fig. 8 is another view similar to Fig. 4 but showing a modified pivot mount for the support and surge operated lock therefor.
Fig. 9 is a detailed sectional view through the forward part of a draft tongue and showing a hand lever actuating means for a lock such as shown in Fig. 8.

In Fig. 8 I show a support which is particularly suitable for application to a horizontal chassis or frame element where the trailer does not adapt itself to mounting the support directly at its bottom as shown in the previous drawings. In this case, the non-rotatable element is indicated generally at 84 and the rotatable element is designated generally at 85, the latter being connected as indicated at 86 to the steerable wheels. The element 84 includes a rearwardly extending arm 87 adapted to be secured in any suitable manner as by means of the bolts 88 to the chassis member and the element further includes a vertical elongated bearing sleeve 89 in and through which is journaled a king pin 90. The pin 90 is non-rotatably and fixedly secured at 91 in a flanged plate 92 which is bolted at 93 to a flange 94 upon the connection 86 so that the pin turns with the steering movements of the wheels. A load supporting bearing 95 is provided between the upper end of the plate 92 and the lower end of the sleeve 89 while bushings 96 are provided between the pin and the sleeve.

A draft and steering member, designated generally at 97 is provided and has a collar portion 98 rotatably mounted about the upper part of the bearing sleeve 89 and about a bushing 99 thereon. The collar 98 has forwardly extending apertured ears or arms, one of which appears at 100 to which the tongue C is pivoted as indicated at 101, exactly as previously described, and extending forwardly between the ears 100 are upper and lower arms 102 and 103 in which are formed openings 104 and 105 for the slidable accommodation of a locking pin 106 identical to that shown in Fig. 7. It may be noted at this point that throughout the construction and modifications herein disclosed, many elements of the combination are identical and interchangeable throughout the structure, to facilitate manufacture.

The member 97 is positioned between a flange 107 upon the sleeve 89 and a circular cap plate 108 which is keyed upon the upper end of the pin 90 and held thereto by a nut 109. The flange 107 and the cap plate 108 have tapered openings indicated at 110 and 111, respectively, for selective engagement with the tapered ends of the locking pin 106, and it will be readily understood that in the upward position of the pin as shown, the member 97 and tongue C will be released from the non-rotatable element 84 to steer the wheels through the pin 90. In the opposite lower position of the pin 106 these members will be locked to the element 85 with the draft tongue in a forwardly extending position as previously described. It will be observed that this operation of the pin 106 is the reverse of that previously described and shown in Figs. 5-7 due to the fact that the rotatable and non-rotatable elements engaged by the pin are reversed one above the other as will be readily understood.

I have here shown actuating mechanism, for the pin 106, operated by surge forces and for this purpose, the tongue C has an inner slidable and telescopic forward portion C' and pins 112 and 113 pass transversely through this portion C' and play at their extremities in longitudinal elongated slots 114 and 115 in the outer portion C of the tongue. An operating rod 116 plays slidably between the pins 112 and 113 and carries collars 117 forwardly and rearwardly of the pins, urged thereagainst by expansion coil springs 118 and 119. The forward spring 118 is held upon the rod by a nut 120 by which adjustment of the tension of the spring may be made, while the rear spring 119 is engaged with the collar 121 held in place by a pin 122 passing through the rod. A series of openings 123 may be provided for the accommodation of the pin 122 so that adjustment of the tension exerted by the rear spring may also be made. The rear end of the rod 116 is pivoted at 124 to a bell crank lever at 125 having a downwardly directed arm pivoted at 126 between the ears 100 immediately below the tongue pivot 101. The bell crank lever extends rearwardly from the pivot 124 and is pivotally attached at 127 to the center of the locking pin 106.

In the operation of this form of my invention, it will be readily understood that when draft is applied to the tongue C the forward inner section C' will be drawn forwardly so that the pins 112 and 113 rest at the forward ends of the slots 114 and 115 to transmit the draft to the trailer. In this position, also, the pins 112 and 113 will pull the operating rod 116 forwardly, swinging the bell crank lever 125 about its pivot 126 and urging the locking pin 106 upwardly so that it will transmit steering movements from the tongue to the trailer wheels. Now, as the tractor is reversed, the rearward push upon the tongue section C' will slide it rearwardly moving the pins 112 and 113 in a corresponding direction and yieldably urging the operating rod 116 in the same direction through the rear spring 119. This motion of the operating rod 116 is translated through the bell crank lever to a downward motion of the locking pin 106 to thus lock the tongue in a straight forwardly extending position. It will, of course, be understood that as the tractor brakes are applied while in forward motion the surge action of the trailer will initiate a corresponding motion of the parts, but the springs 118 and 119 will prevent any damage to any of the actuating elements should such surge action occur when the tongue C is in position for locking by the pin 106.

In Fig. 9 I illustrate a manual control for the operating rod 116 wherein a collar 128 is slidably mounted upon the rod between the springs 118 and 119, which are mounted exactly as previously described. The collar 128 may be moved in forward and rearward directions by fork 129 pivoted at 130 to opposite sides of the collar and connected through a rock shaft 131 to a hand lever 132. The hand lever 132 has the usual latch 133 for engagement with either of a pair of notches 134 upon a quadrant plate 135 secured to the upper side of the tongue. It will be readily understood that the hand lever 132 may be moved forwardly or rearwardly to correspondingly adjust the rod 116 and actuate the locking pin and in this case, since the device is not operated by surge forces, the tongue C need not, of course, have the aforesaid telescoping part C'.

Figure 10:
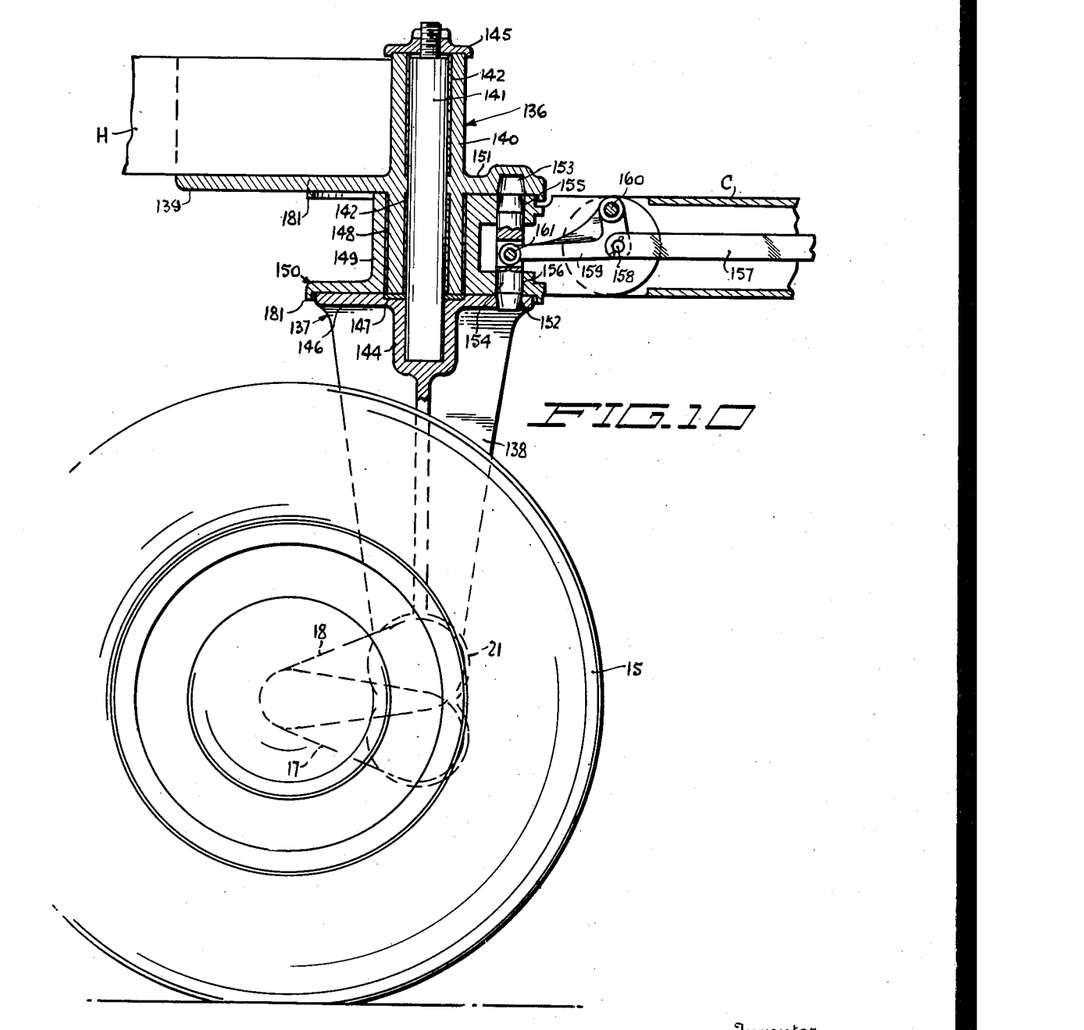
Fig. 10 is a view similar to Fig. 4 but again showing a modified pivot arrangement for the support.

In Fig. 8 the steering support is extended some distance above the trailer chassis member H which may be desirable in some cases but not in others. In Fig. 10 the corresponding parts are located below this member H and in this construction the non-rotatable element is designated generally at 136 and the rotatable element at 137. The latter has a downward extension 138 connected to the wheels as previously described.

The element 136 has a rearwardly extending arm 139 secured beneath the frame or chassis member H and forwardly thereof has a vertical bearing sleeve 140 in which is journaled a king pin 141 in bushings 142. The lower end of the pin 141 is non-rotatably anchored in a short tubular part 144 of the element 137 and the upper end of the pin has a threaded cap nut 145 rotatable atop the sleeve 140. The upper end of rotatable element 137 has a circular flange 146 in which is a bearing 147 engaging the lower end of the downward extension of sleeve 140 and journaled by a bushing 148 on this part of the sleeve is the collar 149 of a draft and steering member indicated generally at 150. The element 136 also has a circular flange 151 above the member 150 and in the flanges 146 and 151 there are formed lower and upper tappered openings or recesses 152 and 153 for locking engagement by the tapered ends of a locking pin 154. Said pin 154 is slidable in upper and lower openings 155 and 156 in the member 150 (like the structure of Fig. 8) and in the lowered position shown the locking pin locks the tongue C to the rotatable element 138 for steering the wheels. In an upper position, the locking pin enters the recess 153 to lock the tongue in its straight forward position.

For actuating the locking pins an operating rod 157 is shown and it may be operated forwardly and rearwardly as in Fig. 8 or 9, or in fact in any other suitable manner. The rear end of this rod 157 is pivoted at 158 to a bell crank lever 159 pivoted at 160 and at 161 pivotally attached to the center of the locking pin to move it upwardly and downwardly. It will be noted that this bell crank lever 159 is reversed as compared to the corresponding lever 125 of Fig. 8 due to the reversal in the relation of the rotatable and no-rotatable parts in this construction.

Figure 11:
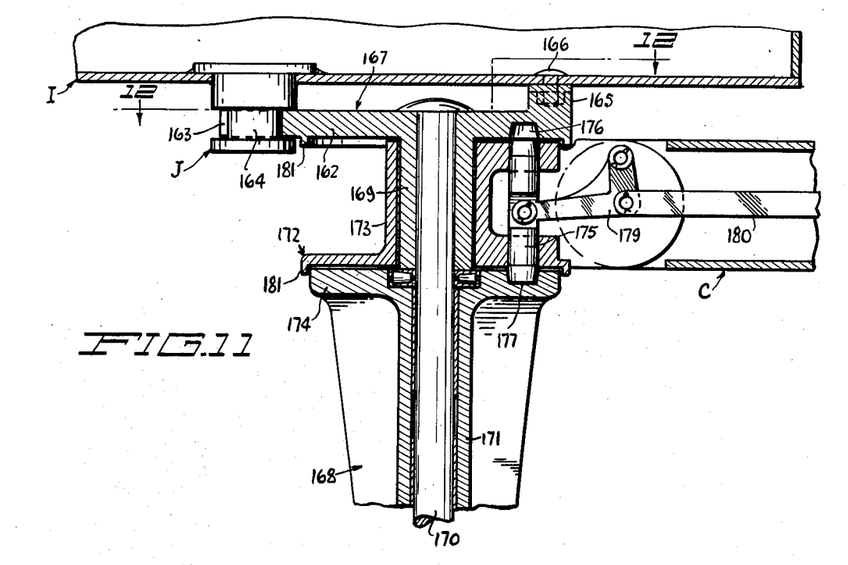
Fig. 11 is a fragmentary vertical sectional view showing a support with an adaptor for conveniently mounting it on a conventional semi-trailer.
Figure 12:
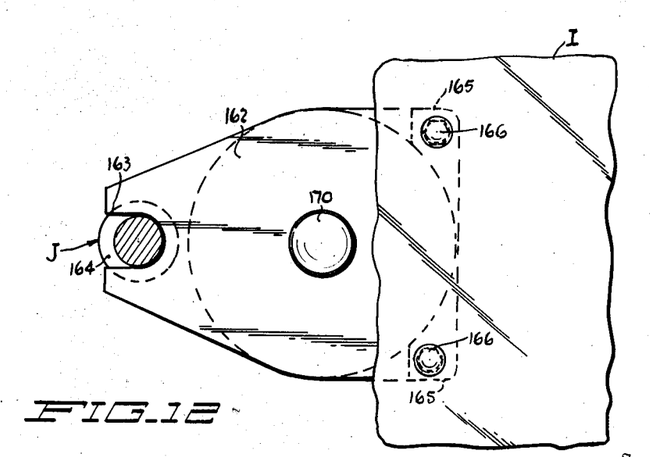
Fig. 12 is a horizontal plan and sectional view along the line 12—12 in Fig. 11.

Referring now to Figs. 11 and 12, I show therein a steerable front end support according to my invention which is designed particularly to application to semi-trailers when they are removed from the tractors. Such a trailer, a body or frame bottom which is designated at I, has a peripherally grooved, depending pin J by which it is ordinarily connected to the fifth wheel unit (not shown) on the tractor. For application to this type of trailer my steerable support has a cap plate 162 with a rearwardly opening slot 163 adapted to fit the groove 164 of said pin J, and forwardly located, transversely spaced lugs 165 which may be bolted to the trailer bottom as designated at 166. Thus, a firm but readily detachable mounting is provided.

As shown here the support, per se, is similar to that of Figs. 3–7, having a non-rotatable element 167 of which the cap plate 162 is a part, and a rotatable element 168. The element 167 has a bearing sleeve 169 in which is fixed a pin 170 and the element 168 has a tubular knuckle 171 journaled on the pin. A draft and steering member 172 has a collar 173 journaled about the bearing sleeve 169 between the underside of the cap plate 162 and the flanged upper end 174 of element 168, and said member 172 is pivotally connected to the draft tongue C as has been described. A locking pin 175 is slidably mounted in the member 172 for selective engagement with recesses 176 and 177 in the cap plate and flange 174, under control of a bell crank lever 178 and operating rod 180 exactly as shown in Fig. 10.

From the foregoing it will be seen that fundamentally and in its broadest aspects my invention provides a means, either automatically, or remotely manually controlled, for locking the steering and draft transmitting element of a trailer in position for straightaway travel of the trailer whenever required, and particularly while backing. The troublesome jackknifing tendencies of all present day hitches of my knowledge are thus totally overcome. In addition there results a safety factor in high speed forward travel, particularly when the trailer is heavy or heavily loaded or both, in that if it is necessary to apply the brakes on the tractor vehicle quickly in an emergency, the steering connection to the trailer may be locked to prevent it careening or jackknifing.

It will be noted that throughout all the constructions shown dust skirts or flanges, indicated collectively at 181, are provided wherever necessary to protect bearing surfaces and wearing surfaces from dust, in accordance with accepted good practice in equipment of this nature.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A steerable wheeled support for the front end of a trailer and including a draft member for connection to a towing vehicle, comprising a first part fixed to the vehicle and a second part supported by the wheels and rotatable on the first part about an upright axis for steering the wheels, a connecting member rotatable about the said axis and connected to the draft member, and means for securing the connecting member, selectively, to the rotatable second part for transmitting draft and steering forces to the support, and to the non-rotatable first part to prevent such steering movements.

2. A steerable wheeled support for a trailer front end, comprising in combination, a rotatable wheel supported element, a non-rotatable element attached to the trailer and supporting the rotatable element for steering movements about a generally upright axis, a draft and steering member also journaled about the steering axis, a draft tongue connected to said member and extending forwardly from the trailer, and means operative to connect said member selectively to the non-rotatable and rotatable elements.

3. A steerable wheeled support for a trailer front end, comprising in combination, a rotatable wheel supported element, a non-rotatable element attached to the trailer and supporting the rotatable element for steering movements about a generally upright axis, a draft and steering member also journaled about the steering axis, a draft tongue connected to said member and extending forwardly from the trailer, means operative to connect said member selectively to the non-rotatable and rotatable elements, and supporting wheels for the rotatable element positioned rearwardly of the steering axis to caster thereabout when the said draft and steering member is disconnected from the rotatable element.

4. A steerable wheeled support for a trailer front end, comprising in combination, a rotatable wheel supported element, a non-rotatable element attached to the trailer and supporting the rotatable element for steering movements about a generally upright axis, a draft and steering member also journaled about the steering axis, a draft tongue connected to said member and extending forwardly from the trailer, means operative to connect said member selectively to the non-rotatable and rotatable elements, supporting wheels for the rotatable element positioned rearwardly of the steering axis to caster thereabout when the said draft and steering member is disconnected from the rotatable element, and differentially connected cranks connecting the wheels to the rotatable element for opposite up and down movements with respect thereto.

5. A steerable wheeled support for a trailer front end, comprising in combination, a rotatable wheel supported element, a non-rotatable element attached to the trailer and supporting the rotatable element for steering movements about a generally upright axis, a draft tongue connecting member also journaled about the said axis upon one of said elements, the said elements each having a locking recess, and a locking member carried by the connecting member and selectively engageable with the said recesses to lock the connecting member to the rotatable element when the trailer is pulled forwardly and to lock said member to the non-rotatable element as the trailer travels rearwardly.

6. A steerable wheeled support for a trailer front end, comprising in combination, a rotatable wheel supported element, a non-rotatable element attached to the trailer and supporting the rotatable element for steering movements about a generally upright axis, a draft tongue connecting member also journaled about the said axis upon one of said elements, the said elements each having a locking recess, and a locking member operative on the tongue connecting member and normally engaged with the recess in the rotatable element to steer the support but engageable with the recess in the non-rotatable element when the connecting member is positioned for straightaway travel of the trailer to thereby lock the connecting member in such position.

7. A steerable wheeled support for a trailer front end, comprising in combination, a rotatable wheel supported element, a non-rotatable element attached to the trailer and supporting the rotatable element for steering movements about a generally upright axis, a draft tongue connecting member also journaled about the said axis upon one of said elements, the said elements each having a locking recess, and a locking bar actuatable in the connecting member for selectively engaging the locking recesses and locking the connecting member to the rotatable and non-rotatable elements.

8. A steerable wheeled support for a trailer front end, comprising in combination, a rotatable wheel supported element, a non-rotatable element attached to the trailer and supporting the rotatable element for steering movements about a generally upright axis, a draft tongue connecting member also journaled about the said axis upon one of said elements, the said elements each having a locking recess, a shuttle acting locking pin carried by the connecting member and engageable at opposite ends selectively with the said locking recesses.

9. A steerable wheeled support for the front end of trailer, comprising a first element secured to the trailer, a second element journaled on the first for steering movements about an upright axis, at least one wheel supporting the second member, a tongue connecting member journaled for swinging movements in a horizontal transverse plane about the same upright axis and adapted to be connected to a towing vehicle forward of the trailer, a lock member normally connecting the tongue connecting member to the second element to steer the wheel supporting the same but shiftable to lock the tongue connection to the first element and to hold the connecting member in a straightahead position, and a hand lever for operating the lock member.

10. A steerable wheeled support for the front end of trailer, comprising a first element secured to the trailer, a second element journaled on the first for steering movements about an upright axis, at least one wheel supporting the second member, a tongue connecting member journaled for swinging movements in a horizontal transverse plane about the same upright axis and adapted to be connected to a towing vehicle forward of the trailer, a lock member normally connecting the tongue connecting member to the second element to steer the wheel supporting the same but shiftable to lock the tongue connection to the first element and to hold the connecting member in a straightahead position, and a remotely controlled means for shifting the lock member.

11. A steerable wheeled support for the front end of trailer, comprising a first element secured to the trailer, a second element journaled on the first for steering movements about an upright axis, at least one wheel supporting the second member, a tongue connecting member journaled for swinging movements in a horizontal transverse plane about the same upright axis and adapted to be connected to a towing vehicle forward of the trailer, a lock member normally connecting the tongue connecting member to the second element to steer the wheel supporting the same but shiftable to lock the tongue connection to the first element and hold the connecting member in a straightahead position, and a remotely controlled hydraulically actuated means for shifting the lock member.

12. A steerable wheeled support for the front end of trailer, comprising a first element secured to the trailer, a second element journaled on the first for steering movements about an upright axis, at least one wheel supporting the second member, a tongue connecting member journaled for swinging movements in a horizontal transverse plane about the same upright axis and adapted to be connected to a towing vehicle forward of the trailer, a lock member normally connecting the tongue connecting member to the second element to steer the wheel supporting the same but shiftable to lock the tongue connection to the first element and to hold the connecting member in a straightahead position, and a remotely controllable electrically operative means for shifting the lock member.

13. A steerable wheeled support for the front end of trailer, comprising a first element secured to the trailer, a second element journaled on the first for steering movements about an upright axis, at least one wheel supporting the second member, a tongue connecting member journaled for swinging movements in a horizontal transverse plane about the same upright axis, a togue for connecting said member to a towing vehicle, a lock member normally connecting the tongue connecting member to the wheel supported second element to steer the wheel but shiftable to the first element to lock the tongue in a straightahead position when backing the trailer, a surge operated means for so shifting the lock member as the trailer is backed.

14. For supporting the front end of a semi-trailer while it is disconnected from the trailer and which trailer is of the type having a depending grooved fifth wheel connection pin, a caster wheel support having a non-rotatable part for connection to the trailer, and a rotatable wheel supported part journaled for rotation on an upright caster axis, a tongue, means for connecting the tongue to the rotatable part for steering the wheel support when moving forwardly and for selectively connecting the tongue to the non-rotatable part in a straightahead position leaving the support free to caster, and said non-rotatable part having means for detachably mounting in beneath the trailer, and for engaging the pin thereon.

15. A steerable caster wheel support for the front end of a trailer and including a draft member for connection to a towing vehicle, comprising a first part fixed to the vehicle and a second part supported by the wheels and rotatable on the first part about an upright axis for steering the wheels, a connecting member rotatable about the said axis and connected to the draft member, the wheels being thus mounted by said second part for full circle castering action, and a locking means for securing the connecting member to the rotatable second part for transmitting draft and steering forces to the support, and in another position securing said member to the non-rotatable first part to lock the member against lateral and steering movements while leaving the wheels free to caster.

ADOLPH RONNING.

REFERENCES CITED

The following references are of record in the file of this patent:

UNITED STATES PATENTS

| Number | Name | Date |
|---|---|---|
| 1,245,054 | Spencer | Oct. 30, 1917 |
| 1,566,617 | Reid | Dec. 22, 1924 |
| 1,611,889 | Clement | Dec. 28, 1926 |
| 1,634,501 | Jackson | July 5, 1927 |
| 1,830,874 | Hendrickson | Nov. 10, 1931 |
| 1,855,237 | Higbee | Apr. 26, 1932 |
| 2,052,645 | Norman | Sept. 1, 1936 |
| 2,134,351 | Arehart | Oct. 25, 1938 |
| 2,256,557 | Gustin | Sept. 23, 1941 |
| 2,339,582 | Peterson | Jan. 18, 1944 |
| 2,347,524 | Swan | Apr. 25, 1944 |